United States Patent [19]
Nishinaka et al.

[11] Patent Number: 5,556,572
[45] Date of Patent: Sep. 17, 1996

[54] RUBBER COMPOSITION FOR CLEANING MOLDS AND EXHIBITING REDUCED AMINO-ALCOHOL VOLATILIZATION AND AMMONIA ODOR, AND METHOD FOR USE THEREOF

[75] Inventors: Koutaro Nishinaka; Yasuyoshi Kawaguchi, both of Tokyo, Japan

[73] Assignee: Bridgestone Corporation, Tokyo, Japan

[21] Appl. No.: 470,121

[22] Filed: Jun. 6, 1995

[30] Foreign Application Priority Data

Jun. 15, 1994 [JP] Japan .................................. 6-133218

[51] Int. Cl.$^6$ .............................. C11D 3/37; C11D 7/20; C11D 7/50; C23G 5/02
[52] U.S. Cl. .................. 510/188; 510/368; 510/372; 510/475; 134/2; 134/4; 134/18; 134/19; 134/22.1; 134/22.19; 134/42; 523/102; 523/218; 524/9; 524/217; 524/221; 524/236; 524/247; 524/765
[58] Field of Search .................. 134/2, 4, 18, 19, 134/22.1, 22.19, 42; 252/98, 102, 104, 119, 154, 174, 174.23, 174.25, 548; 523/102, 218; 524/9, 217, 221, 236, 247, 765

[56] References Cited

U.S. PATENT DOCUMENTS

| | | | |
|---|---|---|---|
| 3,654,940 | 4/1972 | Ritzi | 134/2 |
| 3,961,982 | 6/1976 | DeLorenzo | 134/4 |
| 3,990,906 | 11/1976 | Johnston | 134/1 |
| 4,689,082 | 10/1985 | Dexheimer | 252/174.22 |
| 5,139,530 | 8/1992 | Blanchard | 8/125 |
| 5,441,573 | 8/1995 | Kondo | 134/8 |

FOREIGN PATENT DOCUMENTS

| | | |
|---|---|---|
| 54-63144 | 5/1979 | Japan . |
| 54-107943 | 8/1979 | Japan . |
| 54-126251 | 10/1979 | Japan . |
| 5944980 | 8/1980 | Japan . |
| 57-53812 | 11/1982 | Japan . |
| 58-180600 | 10/1983 | Japan . |
| 61-20585 | 5/1986 | Japan . |
| 62-113518 | 5/1987 | Japan . |
| 63-238143 | 10/1988 | Japan . |
| 5154850 | 6/1993 | Japan . |
| 0546516 | 6/1993 | Japan . |
| 6128416 | 5/1994 | Japan . |

OTHER PUBLICATIONS

Abstract of JP-7068562, Derwent Publications Ltd., Mar. 14, 1995.

Abstract of JP-A-2 099 532, Derwent Publications Ltd., Apr. 1990.

Primary Examiner—Dennis Albrecht
Attorney, Agent, or Firm—Sughrue, Mion, Zinn, Macpeak & Seas

[57] ABSTRACT

There are herein disclosed a rubber composition for cleaning a mold which comprises 100 parts by weight of a natural rubber and/or a synthetic rubber, 2 to 30 parts by weight of an amino-alcohol salt in terms of an amino-alcohol content, 5 to 50 parts by weight of a glycol, 30 to 90 parts by weight of an adsorbent and 0.5 to 10 parts by weight of an organic peroxide, and a method for cleaning the mold by the use of this rubber composition.

Since the amino-alcohol is fixed as the salt, the generation of ammonia odor at the time of kneading or at room temperature can be prevented to improve a working environment, and the volatilization of the amino-alcohol can be inhibited, whereby a mold cleaning effect can be maintained even after the lapse of a long time.

20 Claims, No Drawings

RUBBER COMPOSITION FOR CLEANING MOLDS AND EXHIBITING REDUCED AMINO-ALCOHOL VOLATILIZATION AND AMMONIA ODOR, AND METHOD FOR USE THEREOF

BACKGROUND OF THE INVENTION

1. Field of the Invention

The present invention relates to a technique of cleaning a mold for rubbers. More specifically, it relates to a rubber composition for cleaning a mold whose surface is soiled by repeated vulcanization, and a method for cleaning the soiled mold.

2. Description of the Related Art

In the field of rubber molding, the soil of a mold for vulcanization have been known for a long time, and the soil of the mold increases with the repetition of the vulcanization, so that some problems are present. For example, the molded articles of rubber are seriously impaired in points of quality, appearance, dimensional accuracy and the like, and the release properties of the molded articles from the mold deteriorate and the life of the mold also shortens.

Under such circumstances, many investigations have been carried out to prevent the mold from soiling. For example, there have been suggested a method comprising the step of adding an organic phosphoric ester and a carboxylate of a cyclopentadiene derivative to a solution for the external surface of the mold in Japanese Patent Publication No. 44980/1984, a method which comprises the step of treating the surface of the mold with a compound having silicon and an isocyanate group in its molecule in Japanese Patent Application Laid-open No. 113518/1987, and techniques for inhibiting the soil of the mold by blending a rubber composition with a cyclic polybutadiene (Japanese Patent Application Laid-open No. 63144/1979), an organic phosphoric ester salt (Japanese Patent Publication No. 53812/1982), a mercaptobenzo-1,3-diazol salt (Japanese Patent Application Laid-open No. 107943/1979), a metal carboxylate of a cyclopentadiene derivative (Japanese Patent Application Laid-open No. 126251/1979), 2-mercaptobenzoimidazole or its zinc salt (Japanese Patent Publication No. 20585/1986) or a specific silica (hydrated silicic acid, Japanese Patent Application Laid-open No. 238143/1988).

These methods can decrease the soil of the mold, but they cannot completely prevent the soil. Therefore, the mold has periodically been cleaned by, for example, a shot blast method using glass beads and an acid or an alkali cleaning method, but these mold cleaning techniques tend to damage the mold, accelerate the soil of the mold after the cleaning, and corrode the mold. In addition, for the cleaning, the mold must be detached from a vulcanizing machine, and in particular, in the case that large rubber articles are molded, such an additional step is not negligible, so that productivity lowers inconveniently.

Furthermore, as the techniques of cleaning the mold without detaching it from the vulcanizing machine, there have been a method which comprises using, as a cleaning rubber, a rubber composition containing an amino-alcohol in Japanese Patent Application Laid-open No. 122942/1983, and a method which comprises applying an amino-alcohol or a cleaning solution obtained by dissolving the amino-alcohol in ethanol onto the soiled surface of the mold, and then vulcanizing an unvulcanized rubber composition in a usual manner to clean the mold (Japanese Patent Application Laid-open No. 180600/1983). In addition, many kinds of rubber compositions for cleaning the mold have been commercially available, and they are effective to some extent but they are not sufficient. Moreover, most of these cleaning rubber compositions contain a large amount of an amine agent which easily decomposes, and hence, even at room temperature, ammonia odor is given off. After heating, a large amount of an amine is further generated, and the generated amine corrodes the mold and gives rise to the problem of the pollution of a working environment.

Thus, the present inventors have suggested a rubber composition for cleaning a mold which can be obtained by blending an amino-alcohol, a glycol and an adsorbent with the intention of solving the above-mentioned problems, whereby the problems of the damage and the corrosion of the mold and the problem of the pollution of the working environment can be solved (Japanese Patent Application Laid-open No. 154850/1993). Furthermore, for the purpose of further increasing a cleaning effect by filling the cleaning rubber even into corners of the mold having an intricate shape, there has been suggested a rubber composition for cleaning the mold which can be obtained by blending an amino-alcohol, a glycol, an adsorbent and an organic peroxide (Japanese Patent Application Laid-open No. 128416/1994).

The amino-alcohol which is blended in these rubber compositions for cleaning the mold has the excellent mold cleaning effect.

However, these rubber compositions for cleaning the mold still have a problem that the amino-alcohol vaporizes even at room temperature at the time of kneading or when they are allowed to stand, thereby giving off the ammonia odor, with the result of polluting the working environment. Furthermore, while the compositions are allowed to stand, the amino-alcohol vaporizes with the lapse of time, so that these compositions can not be allowed to stand for a long period of time. Thus, they have a practical problem that their uses are limited and the mold cleaning effect cannot be maintained for a long time.

SUMMARY OF THE INVENTION

An object of the present invention is to provide a rubber composition for cleaning a mold which can prevent the generation of ammonia odor at room temperature at the time of kneading or when the composition is allowed to stand, thereby further improving a working environment and which can inhibit the volatilization of an amino-alcohol to maintain a mold cleaning effect, even when the composition is allowed to stand for the long time.

Another object of the present invention is to provide a method for cleaning the mold by the use of the above-mentioned rubber composition.

In the present invention, the amino-alcohol having the excellent mold cleaning effect is fixed as an amino-alcohol salt in the rubber composition for cleaning the mold by the use of the amino-alcohol and a specific compound, whereby the volatilization of the amino-alcohol can be prevented. Furthermore, this amino-alcohol salt can be decomposed into the amino-alcohol by heating at the time of the mold cleaning to exert the predetermined mold cleaning effect. In consequence, the generation of ammonia odor at room temperature can be prevented at the time of kneading or when the composition is allowed to stand, and the mold cleaning effect can be maintained, even when the composition is allowed to stand for the long time.

A rubber composition for cleaning a mold of the present invention comprises 100 parts by weight of a natural rubber and/or a synthetic rubber, 2 to 30 parts by weight of an amino-alcohol salt in terms of an amino-alcohol content, 5 to 50 parts by weight of a glycol, 30 to 90 parts by weight of an adsorbent and 0.5 to 10 parts by weight of an organic peroxide.

In this case, an organic acid or an inorganic acid and the amino-alcohol from which the amino-alcohol salt is made are preferably contained in an equal equivalent.

The organic acid is preferably at least one selected from the group consisting of monocarboxylic acids and dicarboxylic acids having 46 or less carbon atoms and inorganic acids.

Furthermore, a method for cleaning a mold according to the present invention is directed to a method for cleaning the mold soiled by repeatedly vulcanizing an unvulcanized rubber article which comprises the steps of sticking the sheet of the above-mentioned rubber composition for cleaning the mold on the surface of the unvulcanized rubber article which is to come in contact with the mold, placing the cleaning rubber article having the sheet into the mold, heating the article to allow the cleaning rubber article to adsorb soils, and then taking the cleaning rubber article out of the mold.

DETAILED DESCRIPTION OF THE INVENTION

Next, the content of the present invention will be described.

In a rubber composition for cleaning a mold of the present invention, a single rubber or a blend rubber optionally selected from natural rubbers and various synthetic rubbers can be used, and typical examples of the synthetic rubbers include synthetic polyisopropylene rubber, styrene-butadiene copolymer rubber, polybutadiene rubber, butyl rubber, halogenated butyl rubber and ethylene-propylene terpolymer. These examples are not restrictive.

The amino-alcohol salt which can be used in the present invention can be prepared by reacting (neutralizing) the amino-alcohol with an organic acid or an inorganic acid.

By virtue of the formation of the amino-alcohol salt, the amino-alcohol is fixed in the state of the salt in the rubber composition for cleaning the mold, whereby the volatilization of the amino-alcohol can be prevented. Furthermore, this amino-alcohol salt can decompose into the amino-alcohol at the time of the mold cleaning, i.e., at 165° C. or more which is a mold cleaning temperature, so that a predetermined mold cleaning effect can be exerted.

The beforehand prepared amino-alcohol salt can be blended with the rubber composition at the time of kneading, or the amino-alcohol and the acid may be blended with the rubber composition during the kneading and may react to prepare the amino-alcohol salt.

The amino-alcohol which can be used in the rubber composition for cleaning the mold of the present invention is at least one selected from the group consisting of monoethanolamine, diethanolamine, triethanolamine, N-methylethanolamine, N,N-dimethylethanolamine, N,N-dibutylethanolamine, N,N-diethylethanolamine, N-methyldiethanolamine, 2-amino- 2-methylpropanol, 3-aminopropanol and 2-aminopropanol. The preferable amino-alcohol is at least one selected from the group consisting of monoethanolamine, diethanolamine, 2-amino-2-methylpropanol, 3-aminopropanol and 2-aminopropanol. Therefore, they may be used singly or in a combination of two or more thereof.

In the present invention, as the acid used for the formation of the amino-alcohol salt, for example, the organic acid is selected from the group consisting of monocarboxylic acids and dicarboxylic acids having 46 or less carbon atoms. These acids can be used singly or in a combination of two or more thereof.

If a monocarboxylic acid or a dicarboxylic acid having 47 or more carbon atoms is used, the blend ratio of the acid increases, so that the breaking strength of the vulcanized rubber noticeably deteriorates and the rubber adheres to the mold at the time of the mold cleaning, with the result that the workability of the rubber deteriorate inconveniently.

Examples of the aliphatic monocarboxylic acid having 46 or less carbon atoms include formic acid, acetic acid, propionic acid, butyric acid, isobutyric acid, valeric acid, isovaleric acid, pivalic acid, crotonic acid, caproic acid, caprylic acid, capric acid, lauric acid, myristic acid, palmitic acid and stearic acid.

Examples of the aliphatic dicarboxylic acid having 46 or less carbon atoms include oxalic acid, malonic acid, succinic acid, tartaric acid, glutaric acid, adipic acid, pimelic acid, suberic acid, azelaic acid and sebacic acid.

Examples of the aromatic monocarboxylic acid and dicarboxylic acid having 46 or less carbon atoms include benzoic acid, phthalic acid and isophthalic acid.

In addition, examples of the inorganic acid include hydrochloric acid, diluted sulfuric acid and nitric acid.

The preferable organic acids are the monocarboxylic acids and the dicarboxylic acids having a molecular weight of 200 or less and 18 or less carbon atoms, and the more preferable organic acids are the dicarboxylic acids. When the monocarboxylic acid or the dicarboxylic acid having a molecular weight of 200 or less and 18 or less carbon atoms is used, the blend ratio of the organic acid required to neutralize the amino-alcohol can be decreased, thereby obtaining the rubber composition having excellent release properties, so that the breaking strength of the rubber does not deteriorate and the rubber can be smoothly removed from the mold without remaining in the mold.

In the present invention, the amount of the amino-alcohol salt is in the range of 2 to 30 parts by weight, preferably 5 to 20 parts by weight relative to 100 parts by weight of the rubber in terms of an amino-alcohol content. More specifically, the total amount of the amino-alcohol and the amino-alcohol salt is in the range of 2 to 30 parts by weight, preferably 5 to 20 parts by weight relative to 100 parts by weight of the rubber in terms of the total of the amino-alcohol, wherein each of the amino-alcohol and the amino-alcohol salt is formed or remains free by adding 50 to 150% equivalent of an organic acid or an inorganic acid to the total content of the amino-alcohol. If the amount of the amino-alcohol is less than 2 parts by weight in term of amino-alcohol content, the mold cleaning effect is not sufficient, and if it is more than 30 parts by weight, the breaking strength of the rubber composition deteriorates, so that after the cleaning of the mold, the cleaning rubber composition is torn off at the time of release of the rubber composition from the mold and is left in the mold sometimes, which means that the cleaning effect is poor. In addition, the excessive amino-alcohol is also left on the surface of the mold inconveniently.

The amount of the organic acid or the inorganic acid which can be used to form the amino-alcohol salt may be in the range of 50 to 150% equivalent to the amino-alcohol. If the amount of the acid is less than 50%, the effect of improving the working environment is poor, and when the rubber composition is allowed to stand for a long term, the cleaning effect cannot be maintained. If the amount of the acid is more than 150%, the excessive acid leads to the extension of a vulcanization time, corrosion and the deterioration of the breaking strength of the rubber composition. The most effective amount of the organic acid or the inorganic acid is an equivalent equal to the amino-alcohol which is required to neutralize the amino-alcohol and to thereby form the amino-alcohol salt.

The glycol which can be used in the rubber composition for cleaning the mold of the present invention is at least one selected from the group consisting of ethylene glycol, diethylene glycol, triethylene glycol, propylene glycol and dipropylene glycol, and diethylene glycol and dipropylene glycol are preferable. They may be used singly or in a combination of two or more thereof.

Furthermore, the amount of the glycol is in the range of 5 to 50 parts, preferably 10 to 30 parts by weight relative to 100 parts by weight of the rubber. If the amount of the glycol is less than 5 parts by weight, the mold cleaning effect is not sufficient, and if it is in excess of 50 parts by weight, the additional effect of the increased glycol cannot be obtained, and the breaking strength of the rubber composition deteriorates and the mold cleaning effect is still poor. In addition, the excessive glycol is left on the surface of the mold inconveniently.

In the rubber composition for cleaning the mold of the present invention, an adsorbent is blended in order to remove soils from the surface of the mold, and as the adsorbent, there can be used at least one selected from the group consisting of carbon black, silica, active alumina, active carbon, magnesium oxide, titanium oxide, magnesium carbonate, calcium carbonate, bentonite and diatomaceous earth. In the case that the mold having an intricate shape is used, the cleaning rubber composition is torn off at the release of the rubber composition from the mold after the mold cleaning, and is left in the mold sometimes. Therefore, it is preferable to use silica having a reinforcing effect.

The amount of the adsorbent is in the range of 30 to 90 parts by weight, preferably 40 to 70 parts by weight relative to 100 parts by weight of the rubber. If the amount of the adsorbent is less than 30 parts by weight, the breaking strength of the rubber composition is so low that the soils cannot be completely removed, on the other hand, if it is more than 90 parts by weight, the viscosity of the rubber composition is so high that the rubber does not flow into the narrow portions of the mold at the time of the cleaning. In consequence, some portions of the mold remain inconveniently unclean.

In the rubber composition for cleaning the mold of the present invention, an organic peroxide can be used, and it is required that the decomposition temperature of the organic peroxide which is such as to maintain a half-value period of 1 minute is higher, preferably 5° C. or more higher than a heating temperature at which the rubber composition for cleaning the mold containing the peroxide is used. A typical example of the organic peroxide is at least one selected from the group consisting of 1,1-bis(t-butylperoxy)-3,3,5-trimethylcyclohexane, 1,1-bis(t-butylperoxy)cyclohexane, t-butylperoxymaleic acid, t-butylperoxy oleate, t-butylperoxy 3,3,5-trimethylhexanoate, cyclohexanone peroxide, t-butylperoxyallyl carbonate, t-butylperoxyisopropyl carbonate, 2,5-dimethyl-2,5-di(benzoylperoxy)hexane, 2,2-bis(t-butylperoxy)octane, t-butylperoxy acetate, 2,2-bis(t-butylperoxy)butane, t-butylperoxy benzoate, n-butyl-4,4-bis(t-butylperoxy) valerate, di-t-butylperoxy isophthalate, methyl ethyl ketone peroxide, dicumyl peroxide, 2,5-dimethyl-2,5-di(t-butylperoxy)hexane, α,α'-bis(t-butylperoxy)-m-diisopropylbenzene, t-butylcumyl peroxide, di-isopropylbenzene hydroperoxide, di-t-butyl peroxide and 2,5-dimethyl-2,5-di(t-butylperoxy)hexine-3.

The amount of the organic peroxide is in the range of 0.5 to 10 parts by weight, preferably 1 to 5 parts by weight relative to 100 parts by weight of the rubber. If the amount of the organic peroxide is less than 0.5 part by weight, a crosslink density is low, with the result that the breaking strength of the rubber composition is so low that the soils cannot be completely removed. If it is more than 10 parts by weight, the fluidity of the rubber composition is impaired from the early stage of the crosslinking, so that the rubber does not flow into the narrow portions of the mold at the time of the cleaning. In consequence, some portions of the mold remain inconveniently unclean. In addition, at the release of the rubber composition from the mold after the mold cleaning, the crosslink density is so high that breaking elongation decreases, and in the case that the mold having an intricate shape is used, the rubber composition is torn off at the release of the rubber composition from the mold. As a result, it is left in the mold inconveniently.

In the rubber composition for cleaning the mold of the present invention, water can be blended in order to further increase the cleaning effect. The amount of water to be blended is in the range of 2 to 20 parts by weight relative to 100 parts by weight of the rubber. If the amount of water is less than 2 parts by weight, the effect of added water is not confirmed, on the other hand, if it is more than 20 parts by weight, the effect is not obtained, either, and what is worse, the workability of the kneading of the rubber composition deteriorates inconveniently.

In the rubber composition for cleaning the mold of the present invention, there can be added a filler such as carbon black, a softening agent such as an aroma oil, a naphthenic oil, a vulcanizing agent or a vulcanizing accelerator such as sulfur, an antioxidant and the like, if necessary.

The rubber composition for cleaning the mold of the present invention can be obtained by kneading the rubber component, the amino-alcohol salt, the glycol, the adsorbent, the organic peroxide and, if necessary, the above-mentioned additives by a usual working device such as rolls, a Bambury mixer or a kneader. This kind of rubber composition can be conveniently used to clean the mold for vulcanizing all rubber products such as tires.

Furthermore, the method for cleaning the mold according to the present invention can be carried out by preparing the cleaning rubber composition having the same shape as in an unvulcanized rubber product, and then vulcanizing the composition in a usual vulcanization manner. In this case, the cleaning rubber composition may be shaped into a sheet having a thickness of about 1 to 5 mm, and then the sheet may be stuck on the surface of the unvulcanized rubber product, followed by the vulcanization. This procedure is more preferable, because the excessive amino-alcohol and glycol do not remain on the surface of the mold after the cleaning and there is no problem that the mold is conversely soiled.

Next, the present invention will be described in detail with reference to examples, but the scope of the present invention should not be limited to these examples at all.

In each example, materials shown in Table 1 given below were kneaded by a Bambury mixer to prepare rubber compositions.

The above-mentioned various rubber compositions were allowed to stand at 100° C. (at the kneading) and room temperature, and the generation state of ammonia odor was evaluated by the sense of smell. Their results are shown in Table 1.

In order to evaluate the change of the above-mentioned various rubber compositions with the lapse of time, they were allowed to stand at room temperature for 2 days, 10 days and 30 days, and the compositions were then shaped into unvulcanized sheets having a thickness of 2 mm. Next, these rubber sheets (Examples 1 to 8, and Comparative Examples 1 and 2) were stuck on the 4-divided surface of each raw tire having a tire size of 135SR12.

Each of these raw tires was placed in a mold whose surface was soiled in black by continuously vulcanizing a tire having the same size for 2 weeks, and the raw tire was vulcanized at a platen temperature of 165° C. for 15 minutes. The vulcanized tire was taken out of the mold in a usual manner, and thus the cleaning was carried out.

At this time, a cleaning degree was evaluated with the naked eye. The evaluation was ranked by 10 ranks. A case where the mold was not cleaned at all was represented by 1, and a case where the mold was completely cleaned was represented by 10. The results are shown in Table 1 given below.

TABLE 1

|  | Comp. Ex. | | Example | | |
| --- | --- | --- | --- | --- | --- |
|  | 1 | 2 | 1 | 2 | 3 |
| Rubber Composition for Cleaning Mold (pts. wt.) | | | | | |
| Rubber: natural rubber | 100 | 100 | 100 | 100 | 100 |
| Adsorbent: silica | 60 | 60 | 60 | 60 | 60 |
| Glycols: | | | | | |
| Dipropylene glycol | 15 | | 15 | 15 | 15 |
| Diethylene glycol | | 20 | | | |
| Organic peroxide: Perhexa V*¹ | 2 | 2 | 2 | 2 | 2 |
| Amino-alcohol salts: | | | | | |
| Monoethanolamine | 10 | | 10 | 10 | 10 |
| N-methylethanolamine | | 10 | | | |
| Stearic acid | 1 | 1 | 38 | | |
| Lauric acid | | | | 33 | |
| Adipic acid | | | | | 12 |
| Tartaric acid | | | | | |
| Crotonic acid | | | | | |
| Hydrochloric acid | | | | | |
| Zinc Flower | 3 | 3 | 3 | 3 | 3 |
| Water | 6 | 6 | 6 | 6 | 6 |
| Evaluation | | | | | |
| Ammonia Odor: | | | | | |
| room temp. | Pres't | Pres't | Abs't | Abs't | Abs't |
| 100° C. | Pres't | Pres't | Abs't | Abs't | Abs't |
| Mold Clearning Effect: | | | | | |
| after 2 days | 10 | 10 | 9 | 9 | 10 |
| after 10 days | 9 | 9 | 9 | 9 | 10 |
| after 30 days | 8 | 7 | 9 | 9 | 10 |

|  | Example | | | | |
| --- | --- | --- | --- | --- | --- |
|  | 4 | 5 | 6 | 7 | 8 |
| Rubber Composition for Cleaning Mold (pts. wt.) | | | | | |
| Rubber: natural rubber | 100 | 100 | 100 | 100 | 100 |
| Adsorbent: silica | 60 | 60 | 60 | 60 | 60 |
| Glycols: | | | | | |
| Dipropylene glycol | 15 | 15 | | | 15 |
| Diethylene glycol | | | 20 | 20 | |
| Organic peroxide: Perhexa V*¹ | 2 | 2 | 2 | 2 | 2 |
| Amino-alcohol salts: | | | | | |
| Monoethanolamine | 10 | 10 | | | 10 |
| N-methylethanolamine | | | 10 | 10 | |
| Stearic acid | | | | | |
| Lauric acid | | 27 | | | |
| Adipic acid | | | | | |
| Tartaric acid | 13 | | | 10 | |
| Crotonic acid | | 14 | | | |
| Hydrochloric acid | | | | | 6 |
| Zinc Flower | 3 | 3 | 3 | 3 | 3 |
| Water | 6 | 6 | 6 | 6 | 6 |
| Evaluation | | | | | |
| Ammonia Odor: | | | | | |
| room temp. | Abs't | Abs't | Abs't | Abs't | Abs't |
| 100° C. | Abs't | Abs't | Abs't | Abs't | Abs't |
| Mold Clearning Effect: | | | | | |
| after 2 days | 10 | 10 | 9 | 9 | 10 |
| after 10 days | 10 | 10 | 9 | 9 | 10 |
| after 30 days | 10 | 10 | 9 | 9 | 10 |

*¹n-butyl-4,4-bis(t-butylperoxy) valerate (half-value period temperature = 166° C., made by Nippon Oils & Fats Co., Ltd.)

Generally referring to the results in Table 1, it is apparent that in Examples 1 to 8 of the present invention, the generation of ammonia odor can be prevented at room temperature and even at 100° C. (at the kneading) owing to the blend of the amino-alcohol salt, and a working environment can be improved. In addition, even after the lapse of some time, the volatilization of the amino-alcohol is inhibited, and so an excellent mold cleaning effect can be maintained for a long term.

Individually referring to the results in Table 1, Examples 1 to 7 utilize the amino-alcohol salts of the amino-alcohols and the organic acids and Example 8 utilizes the amino-alcohol salt of the amino-alcohol and the inorganic acid. Above all, in the amino-alcohol salt of monoethanolamine and adipic acid in Example 3, the amino-alcohol salt of monoethanolamine and tartaric acid in Example 4, and the amino-alcohol salt of monoethanolamine and crotonic acid in Example 5, the organic acids (a monocarboxylic acid or dicarboxylic acids) having 18 or less carbon atoms and a molecular weight of 200 or less are used, and in these examples, a particularly excellent mold cleaning effect can be maintained even after the rubber compositions are allowed to stand for some time.

On the contrary, Comparative Examples 1 and 2 are outside the scope of the present invention. In Comparative Example 1, monoethanolamine which is not fixed in the state of a salt is utilized, and in Comparative Example 2, N-methylethanolamine which is not fixed in the state of a salt is used. In these cases, ammonia odor is generated at 100° C. (at the kneading) and even at room temperature to worsen a working environment. In addition, the amino-alcohol is volatilized, so that the mold cleaning effect also deteriorates after the rubber compositions are allowed to stand for some time.

What is claimed is:

1. A rubber composition for cleaning a mold which comprises 100 parts by weight of a natural rubber and/or a synthetic rubber, 2 to 30 parts by weight of an amino-alcohol salt in terms of an amino-alcohol content wherein the acid for forming the amino-alcohol salt is at least one acid selected from the group consisting of monocarboxylic acids and dicarboxylic acids both of which have 46 or less carbon atoms and inorganic acids, 5 to 50 parts by weight of a glycol selected from the group consisting of ethylene glycol, diethylene glycol, triethylene glycol, propylene glycol and dipropylene glycol, 30 to 90 parts by weight of an adsorbent selected from the group consisting of carbon black, silica, active alumina, active carbon, magnesium oxide, titanium oxide, magnesium carbonate, calcium carbonate, bentonite and diatomaceous earth and 0.5 to 10 parts by weight of an organic peroxide.

2. The rubber composition for cleaning a mold according to claim 1 wherein the amino-alcohol salt comprises an amino-alcohol salt and amino-alcohol each of which is formed or remains free by adding 50 to 150% equivalent of said organic acid or inorganic acid to an amino-alcohol, and the amino-alcohol salt contains 2 to 30 parts by weight of the amino-alcohol content in total relative to 100 parts by weight of the rubber.

3. The rubber composition for cleaning a mold according to claim 1 wherein the amino-alcohol is at least one selected from the group consisting of monoethanolamine, diethanolamine, triethanolamine, N-methylethanolamine, N,N-dimethylethanolamine, N,N-dibutylethanolamine, N,N-diethylethanolamine, N-methyldiethanolamine, 2-amino-2-methylpropanol, 3-aminopropanol and 2-aminopropanol.

4. The rubber composition for cleaning a mold according to claim 2 wherein the amino-alcohol is at least one selected from the group consisting of monoethanolamine, diethanolamine, triethanolamine, N-methylethanolamine, N,N-dimethylethanolamine, N,N-dibutylethanolamine, N,N-diethylethanolamine, N-methyldiethanolamine, 2-amino-2-methylpropanol, 3-aminopropanol and 2-aminopropanol.

5. The rubber composition for cleaning a mold according to claim 1 wherein the amino-alcohol is at least one selected from the group consisting of monoethanolamine, diethanolamine, 2-amino-2-methylpropanol, 3-aminopropanol and 2-aminopropanol.

6. The rubber composition for cleaning a mold according to claim 2 wherein the amino-alcohol is at least one selected from the group consisting of monoethanolamine, diethanolamine, 2-amino-2-methylpropanol, 3-aminopropanol and 2-aminopropanol.

7. The rubber composition for cleaning a mold according to claim 1 wherein the amount of the amino-alcohol is in the range of 5 to 20 parts by weight relative to 100 parts by weight of the rubber in terms of the amino-alcohol content.

8. The rubber composition for cleaning a mold according to claim 2 wherein the amount of the amino-alcohol is in the range of 5 to 20 parts by weight relative to 100 parts by weight of the rubber in terms of the amino-alcohol content.

9. The rubber composition for cleaning a mold according to claim 1 wherein the amino-alcohol salt comprises an amino-alcohol and at least one acid selected from the group consisting of monocarboxylic acids and dicarboxylic acids both of which have 46 or less carbon atoms and inorganic acids.

10. The rubber composition for cleaning a mold according to claim 1 wherein the amino-alcohol salt comprises an amino-alcohol and at least one acid selected from the group consisting of monocarboxylic acids and dicarboxylic acids both of which have 18 or less carbon atoms and inorganic acids.

11. The rubber composition for cleaning a mold according to claim 2 wherein the acid for forming the amino-alcohol salt is at least one acid selected from the group consisting of monocarboxylic acids and dicarboxylic acids both of which have 18 or less carbon atoms and inorganic acids.

12. The rubber composition for cleaning a mold according to claim 1 wherein the glycol is diethylene glycol and/or dipropylene glycol.

13. The rubber composition for cleaning a mold according to claim 1 wherein the amount of the glycol is in the range of 10 to 30 parts by weight relative to 100 parts by weight of the rubber.

14. The rubber composition for cleaning a mold according to claim 1 wherein the organic peroxide contains the organic peroxide whose decomposition temperature, at which a half-value period by decomposition is 1 minute or less, is 5° C. or more higher than a heating temperature at which the rubber composition for cleaning the mold is used.

15. The rubber composition for cleaning a mold according to claim 1 wherein the organic peroxide is at least one selected from the group consisting of 1,1 -bis(t-butylperoxy)-3,3,5-trimethylcyclohexane, 1,1-bis(t-butylperoxy)cyclohexane, t-butylperoxymaleic acid, t-butylperoxy oleate, t-butylperoxy 3,3,5-trimethylhexanoate, cyclohexanone peroxide, t-butylperoxyallyl carbonate, t-butylperoxyisopropyl carbonate, 2,5-dimethyl-2,5-di(benzoylperoxy)hexane, 2,2 -bis(t-butylperoxy)octane, t-butylperoxy acetate, 2,2 -bis(t-butylperoxy)butane, t-butylperoxy benzoate, n-butyl-4,4-bis(t-butylperoxy) valerate, di-t-butylperoxy isophthalate, methyl ethyl ketone peroxide, dicumyl peroxide, 2,5-dimethyl-2,5-di(t-butylperoxy)hexane, $\alpha,\alpha'$-bis(t-butylperoxy)-m-diisopropylbenzene, t-butylcumyl peroxide, di-isopropylbenzene hydroperoxide, di-t-butyl peroxide and 2,5-dimethyl-2,5-di(t-butylperoxy)hexine-3.

16. The rubber composition for cleaning a mold according to claim 1 wherein the amount of the organic peroxide is in the range of 1 to 5 parts by weight relative to 100 parts by weight of the rubber.

17. The rubber composition for cleaning a mold according to claim 1 wherein the adsorbent is silica.

18. The rubber composition for cleaning a mold according to claim 1 wherein the amount of the adsorbent is in the range of 40 to 70 parts by weight relative to 100 parts by weight of the rubber.

19. The rubber composition for cleaning a mold according to claim 1 wherein water is blended in an amount of 2 to 20 parts by weight relative to 100 parts by weight of the rubber.

20. A method for cleaning a mold soiled by repeatedly vulcanizing an unvulcanized rubber article which comprises the steps of sticking the sheet of a rubber composition for cleaning the mold described in any one of claims 1–19 on the surface of the unvulcanized rubber article which comes in contact with the mold, placing the cleaning rubber article attached the sheet in the mold, heating the article to allow the cleaning rubber article to adsorb soils, and then taking the cleaning rubber article out of the mold.

* * * * *